United States Patent
Lee et al.

(10) Patent No.: US 10,397,651 B2
(45) Date of Patent: *Aug. 27, 2019

(54) MEDIA CHANNEL IDENTIFICATION WITH MULTI-MATCH DETECTION AND DISAMBIGUATION BASED ON SINGLE-MATCH

(71) Applicant: Gracenote, Inc., Emeryville, CA (US)

(72) Inventors: Jaehyung Lee, Seoul (KR); Chung Won Seo, Seoul (KR); Youngmoo Kwon, Goyang (KR)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,783

(22) Filed: Jun. 22, 2018

(65) Prior Publication Data

US 2018/0316967 A1    Nov. 1, 2018

Related U.S. Application Data

(63) Continuation of application No. 15/222,405, filed on Jul. 28, 2016, now Pat. No. 10,063,918, which is a
(Continued)

(51) Int. Cl.
*H04H 60/32* (2008.01)
*H04N 21/442* (2011.01)
(Continued)

(52) U.S. Cl.
CPC ..... *H04N 21/44204* (2013.01); *H04N 21/222* (2013.01); *H04N 21/278* (2013.01);
(Continued)

(58) Field of Classification Search
CPC combination set(s) only.
See application file for complete search history.

(56) References Cited

U.S. PATENT DOCUMENTS 7,461,392 B2    12/2008    Herley
7,653,921 B2    1/2010     Herley
(Continued)

FOREIGN PATENT DOCUMENTS

CN    102176208    9/2011
CN    103501449    1/2014
(Continued)

OTHER PUBLICATIONS

US 9,189,826 B1, 11/2015, Sharifi et al. (withdrawn)
(Continued)

*Primary Examiner* — Mulugeta Mengesha
(74) *Attorney, Agent, or Firm* — McDonnell Boehnen Hulbert & Berghoff LLP

(57) ABSTRACT

Disclosed herein are methods and systems to help disambiguate channel identification in a scenario where fingerprint data of media content matches multiple reference fingerprints corresponding respectively with multiple different channels. Upon detecting such a multi-match, a server or other entity will perform disambiguation based on a determination that a segment of the fingerprint data matches a reference fingerprint corresponding with just a single channel, such as a reference fingerprint representing commercial or news programming content specific to just the single channel. The server or other entity will thereby determine the channel on which the media content being rendered by the media presentation device is arriving, so as to facilitate taking channel-specific action.

20 Claims, 7 Drawing Sheets

Related U.S. Application Data continuation-in-part of application No. 15/179,143, filed on Jun. 10, 2016, now Pat. No. 9,924,222.

(60) Provisional application No. 62/301,616, filed on Feb. 29, 2016.

(51) Int. Cl.
| | |
|---|---|
| *H04N 21/222* | (2011.01) |
| *H04N 21/278* | (2011.01) |
| *H04N 21/435* | (2011.01) |
| *H04N 21/845* | (2011.01) |
| *H04N 21/61* | (2011.01) |
| *H04N 21/81* | (2011.01) |
| *H04N 21/84* | (2011.01) |
| *H04N 21/44* | (2011.01) |

(52) U.S. Cl.
CPC ..... *H04N 21/435* (2013.01); *H04N 21/44008* (2013.01); *H04N 21/6118* (2013.01); *H04N 21/812* (2013.01); *H04N 21/8126* (2013.01); *H04N 21/84* (2013.01); *H04N 21/8456* (2013.01)

(56) References Cited

U.S. PATENT DOCUMENTS

| | | | |
|---|---|---|---|
| 7,788,696 | B2 | 8/2010 | Burges et al. |
| 7,797,249 | B2 | 9/2010 | Schmeizer et al. |
| 7,917,645 | B2 | 3/2011 | Ikezoye et al. |
| 8,150,096 | B2 | 4/2012 | Alattar |
| 8,185,733 | B2 | 5/2012 | Schwartz et al. |
| 8,510,770 | B1 | 8/2013 | Oztaskent et al. |
| 8,649,659 | B2 | 2/2014 | Lalwaney |
| 8,700,194 | B2 | 4/2014 | Bauer et al. |
| 9,094,715 | B2 * | 7/2015 | Neumeier .......... H04N 5/44591 |
| 9,203,538 | B2 | 12/2015 | Anniballi et al. |
| 9,240,851 | B2 | 1/2016 | Park |
| 9,275,427 | B1 | 3/2016 | Sharifi |
| 9,412,330 | B2 | 8/2016 | Keating et al. |
| 9,465,995 | B2 | 10/2016 | Harron et al. |
| 9,609,391 | B2 | 3/2017 | Oztaskent et al. |
| 9,635,417 | B2 | 4/2017 | Grant et al. |
| 9,704,016 | B2 | 7/2017 | Jang et al. |
| 9,706,261 | B2 | 7/2017 | Chen |
| 9,906,843 | B2 | 2/2018 | Yabu et al. |
| 9,967,613 | B2 | 5/2018 | Kitazato |
| 9,986,306 | B2 | 5/2018 | Nagorski et al. |
| 9,992,527 | B2 | 6/2018 | An et al. |
| 10,200,765 | B2 | 2/2019 | Yabu |
| 2002/0083060 | A1 | 6/2002 | Wang et al. |
| 2003/0046437 | A1 | 3/2003 | Eytchison et al. |
| 2003/0063217 | A1 | 4/2003 | Smith |
| 2004/0143349 | A1 | 7/2004 | Roberts et al. |
| 2005/0144455 | A1 | 6/2005 | Haitsma |
| 2006/0062426 | A1 | 3/2006 | Levy et al. |
| 2006/0182412 | A1 | 8/2006 | Lefevre |
| 2007/0055500 | A1 | 3/2007 | Bilobrov |
| 2007/0124756 | A1 | 5/2007 | Covell et al. |
| 2007/0143777 | A1 | 6/2007 | Wang |
| 2007/0192782 | A1 | 8/2007 | Ramaswamy |
| 2007/0217648 | A1 | 9/2007 | Muehlbauer |
| 2008/0060036 | A1 | 3/2008 | Cox |
| 2008/0082510 | A1 | 4/2008 | Wang et al. |
| 2010/0131970 | A1 | 5/2010 | Falcon |
| 2010/0293568 | A1 | 11/2010 | Jarman |
| 2010/0318587 | A1 | 12/2010 | Seet et al. |
| 2010/0329547 | A1 | 12/2010 | Cavet |
| 2011/0075851 | A1 | 3/2011 | LeBoeuf et al. |
| 2011/0273455 | A1 | 11/2011 | Powar et al. |
| 2011/0289098 | A1 | 11/2011 | Oztaskent et al. |
| 2011/0313856 | A1 | 12/2011 | Cohen et al. |
| 2012/0089911 | A1 | 4/2012 | Hosking et al. |
| 2012/0117584 | A1 | 5/2012 | Gordon |
| 2013/0011008 | A1 | 1/2013 | Ikezoye et al. |
| 2013/0052939 | A1 | 2/2013 | Anniballi et al. |
| 2013/0054645 | A1 | 2/2013 | Bhagavathy et al. |
| 2013/0145414 | A1 | 6/2013 | Yamagishi |
| 2013/0152139 | A1 | 6/2013 | Davis et al. |
| 2013/0205330 | A1 | 8/2013 | Sinha et al. |
| 2013/0212609 | A1 | 8/2013 | Sinha et al. |
| 2013/0254793 | A1 | 9/2013 | Anniballi et al. |
| 2013/0308818 | A1 | 11/2013 | MacIntosh et al. |
| 2013/0326573 | A1 | 12/2013 | Sharon et al. |
| 2014/0007152 | A1 | 1/2014 | Pora et al. |
| 2014/0013352 | A1 | 1/2014 | Shavit et al. |
| 2014/0059587 | A1 | 2/2014 | Davis et al. |
| 2014/0082655 | A1 | 3/2014 | Moon et al. |
| 2014/0089307 | A1 | 3/2014 | Garside et al. |
| 2014/0115627 | A1 * | 4/2014 | Lee .................. H04N 21/812 725/34 |
| 2014/0193027 | A1 | 7/2014 | Scherf et al. |
| 2014/0196077 | A1 | 7/2014 | Gordon et al. |
| 2014/0236988 | A1 | 8/2014 | Harron et al. |
| 2014/0282662 | A1 | 9/2014 | Major |
| 2014/0282693 | A1 | 9/2014 | Soundararajan et al. |
| 2014/0337874 | A1 | 11/2014 | Kitazato |
| 2015/0020094 | A1 | 1/2015 | Moon et al. |
| 2015/0033500 | A1 | 2/2015 | Block et al. |
| 2015/0089526 | A1 | 3/2015 | Gordon |
| 2015/0106839 | A1 | 4/2015 | Shrum, Jr. et al. |
| 2015/0120839 | A1 | 4/2015 | Kannan et al. |
| 2015/0181263 | A1 | 6/2015 | Gordon et al. |
| 2015/0237409 | A1 | 8/2015 | Harper et al. |
| 2016/0094877 | A1 | 3/2016 | Heffernan et al. |
| 2016/0127398 | A1 | 5/2016 | Cohen |
| 2016/0316261 | A1 | 10/2016 | Koshevoy |
| 2017/0048566 | A1 | 2/2017 | Srinivasan |
| 2017/0308556 | A1 | 10/2017 | Gonzales-Brenes, Jr. et al. |
| 2017/0330474 | A1 | 11/2017 | Rho et al. |

FOREIGN PATENT DOCUMENTS

| | | |
|---|---|---|
| CN | 103581705 | 2/2014 |
| EP | 2 763 427 | 11/2011 |
| EP | 2 704 444 | 3/2014 |
| JP | 2001298433 | 10/2001 |
| JP | 2011217144 | 10/2011 |
| JP | 2012156643 | 8/2012 |
| JP | 2015008508 | 1/2015 |
| KR | 20130124911 | 11/2013 |
| WO | WO 2005/079499 | 9/2005 |
| WO | WO 2008/042953 | 4/2008 |
| WO | WO 2014/004914 | 1/2014 |

OTHER PUBLICATIONS

International Search Report and Written Opinion from International Application No. PCT/US2017/019946, dated May 24, 2017.
Office Action from U.S. Appl. No. 15/443,580, dated Dec. 14, 2017.
Office Action from U.S. Appl. No. 15/443,580, dated May 21, 2018.

* cited by examiner

MEDIA CHANNEL IDENTIFICATION WITH MULTI-MATCH DETECTION AND DISAMBIGUATION BASED ON SINGLE-MATCH

REFERENCE TO RELATED APPLICATIONS

This application is a continuation of U.S. patent application Ser. No. 15/222,405, filed Jul. 28, 2016, which is a continuation-in-part of U.S. patent application Ser. No. 15/179,143, filed Jun. 10, 2016, issued as U.S. Pat. No. 9,924,222, and which claims priority to U.S. Provisional Patent Application No. 62/301,616, filed Feb. 29, 2016, the entirety of each of which is hereby incorporated by reference. In addition, the disclosure of U.S. Patent Application Pub. No. 2015/0181263 is hereby incorporated by reference in its entirety.

BACKGROUND

A typical media presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a media presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered (e.g., being already rendered, currently being rendered, or being in queue to be rendered) by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes a reference fingerprint of each of the channels available to provide media content to the media presentation device (e.g., each of the channels within a subscription plan for a set-top box that supplies media content to the media presentation device) and that maps each reference fingerprint to the channel on which the media content is provided. As the media presentation device receives and renders given media content, the media presentation device may then generate a fingerprint of that media content and, through a network communication interface, report the generated fingerprint to the network server for analysis. The network server may then compare the reported fingerprint with the reference fingerprint data to find a match with a reference fingerprint and to thereby determine that the channel on which the media content is arriving is the channel that the reference data maps with that reference fingerprint. Upon thereby determining the channel on which the media content is arriving, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same media content may be provided on multiple different channels, whether concurrently or at different times, and so a fingerprint of media content being rendered by a media presentation device may not correlate with just the channel on which the media content is arriving. For example, a sports game or political event might be broadcast concurrently on multiple different channels, or a syndicated television or radio show might be broadcast on multiple different such channels concurrently or at different times. In these or other scenarios, if the media presentation device is presenting such media content and generates and provides a fingerprint of the media content, that fingerprint could be mapped to multiple reference fingerprints, and consequently the channel-identification would be inconclusive.

As a specific example of this, consider a scenario where two different video content providers both broadcast the same sports game, each on a separate respective channel, and where an advertiser has a contract with just one of the content providers to present a pop-up advertisement on that provider's broadcast of the game. In this scenario, when a media presentation device is receiving and presenting one of these broadcasts, if the media presentation device generates and provides to the network server a fingerprint of the broadcast, the network server may determine that the fingerprint matches both content providers' broadcasts of the game, and so it would be unclear whether the media presentation device should present the pop-up advertisement or not.

Disclosed herein are methods and systems to help disambiguate channel identification in a scenario where fingerprint data of media content matches multiple reference fingerprints corresponding respectively with multiple different channels. In accordance with the disclosure, a network server or other entity carrying out this analysis will detect a multi-match scenario by determining that the fingerprint of a first portion of the media content at issue matches two or more reference fingerprints corresponding respectively with different channels. Faced with the detected multi-match scenario, the entity will then perform disambiguation based on a further determination that the fingerprint of a second portion of the media content at issue matches just one of the two or more reference fingerprints, thereby establishing that the channel corresponding with the one matching reference fingerprint is the channel on which the media content being rendered by the media presentation device is arriving, so as to facilitate taking channel-specific action.

In implementation, although the first portion of the media content could be common to two or more channels, the second portion of the media content could represent channel-distinguishing content specific to one of those channels, such as local commercial content and news programming. For example, two separate channels in separate markets or even in the same market could carry the same programming generally, thus giving rise to a possible multi-match scenario, but the channels could differ from each other by carrying different respective local commercial advertisements and/or news programming, thus supporting multi-match resolution.

In practice, for instance, when the entity receives from the media presentation device a fingerprint of media content being presented by the media presentation device, the entity could detect a multi-match scenario by determining that the fingerprint matches two or more reference fingerprints corresponding respectively with different channels. But further, before or after detecting the multi-match scenario, the entity could also determine that a portion of the received fingerprint matches a portion of just one of the reference fingerprints, corresponding with channel-distinguishing content such as local commercial content or news programming. And the entity could therefore conclude that the channel carrying that channel-distinguishing content is the channel on which the media content being rendered by the media presentation device is arriving.

Accordingly, disclosed is a method that involves taking action based on a channel determined through disambiguation based on a single-match, with respect to commercial content, news programming, or other channel-distinguishing content. The method includes a computing system determining that a fingerprint of a first segment of media content being rendered by a media presentation device matches multiple reference fingerprints each corresponding with a different respective channel. Further, the method includes, responsive to at least the determining that the fingerprint of the first segment matches the multiple reference fingerprints each corresponding with a different respective channel, performing disambiguation based at least in part on a determination that a fingerprint of a second segment of the media content being rendered by the media presentation device matches a reference fingerprint corresponding with just a single channel, the disambiguation establishing that the media presentation device is receiving the media content on the single channel. And the method includes taking action based on the establishing that the media presentation device is receiving the media content on the single channel.

Further, the disclosed method could take other forms as well. For example, the method could include a computing system comparing (i) query fingerprint data representing sequential time segments of media content being rendered by a media presentation device with (ii) reference fingerprint data respectively for each of a plurality of known channels of media content. The method could then include, based on the comparing with respect to a first one or more of the time segments of the media content being rendered by the media presentation device, the computing system detecting a multi-match, where the media content rendered by the media presentation device matches multiple ones of the plurality of channels of media content. And the method could further include, based on the comparing with respect to a second one or more of the time segments of the media content being rendered by the media presentation device, the computing system detecting a single-match, where the media content rendered by the media presentation device matches just a single one of the multiple channels of media content.

The method could then include the computing system using the detected single-match to disambiguate the detected multi-match, thereby establishing that the single channel of media content is the channel carrying the media content being rendered by the media presentation device. And the method could include taking action based on the establishing that the single channel is the channel carrying the media content being rendered by the media presentation device.

Still further, disclosed is a system including a network communication interface, a processing unit, non-transitory data storage, and program instructions stored in (e.g., on) the non-transitory data storage and executable by the processing unit to carry out various operations. The operations include receiving from a media presentation device, via the network communication interface, a fingerprint of media content being rendered by the media presentation device. Further, the operations include determining that the received fingerprint matches multiple reference fingerprints each corresponding with a different respective channel. And the operations include, responsive to determining that the received fingerprint matches the multiple reference fingerprints each corresponding with a different respective channel, performing disambiguation based at least in part on a determination that a segment of the received fingerprint matches a reference fingerprint corresponding with just a single channel, the disambiguation establishing that the single channel carries the media content being rendered by the media presentation device. And further, the operations include taking action based on the establishing that the single channel carries the media content being rendered by the media presentation device.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
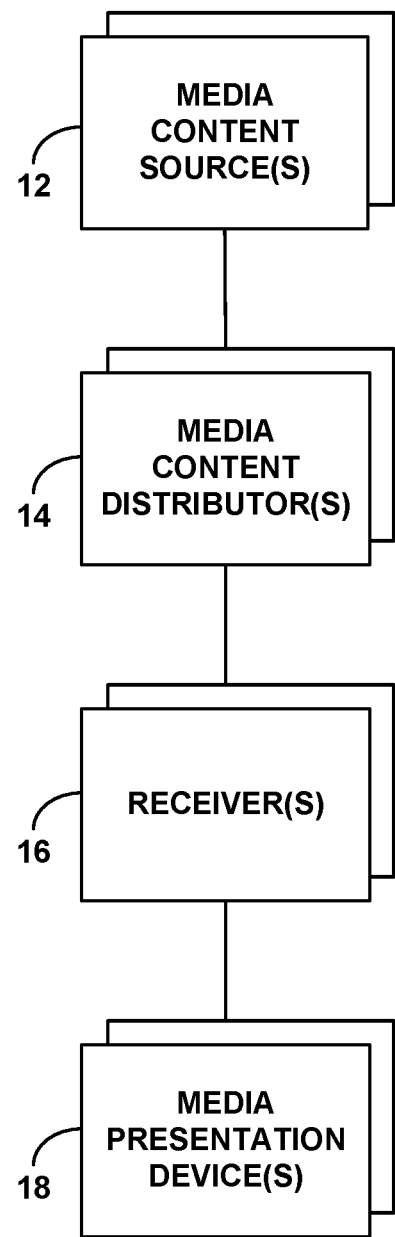
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors in particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
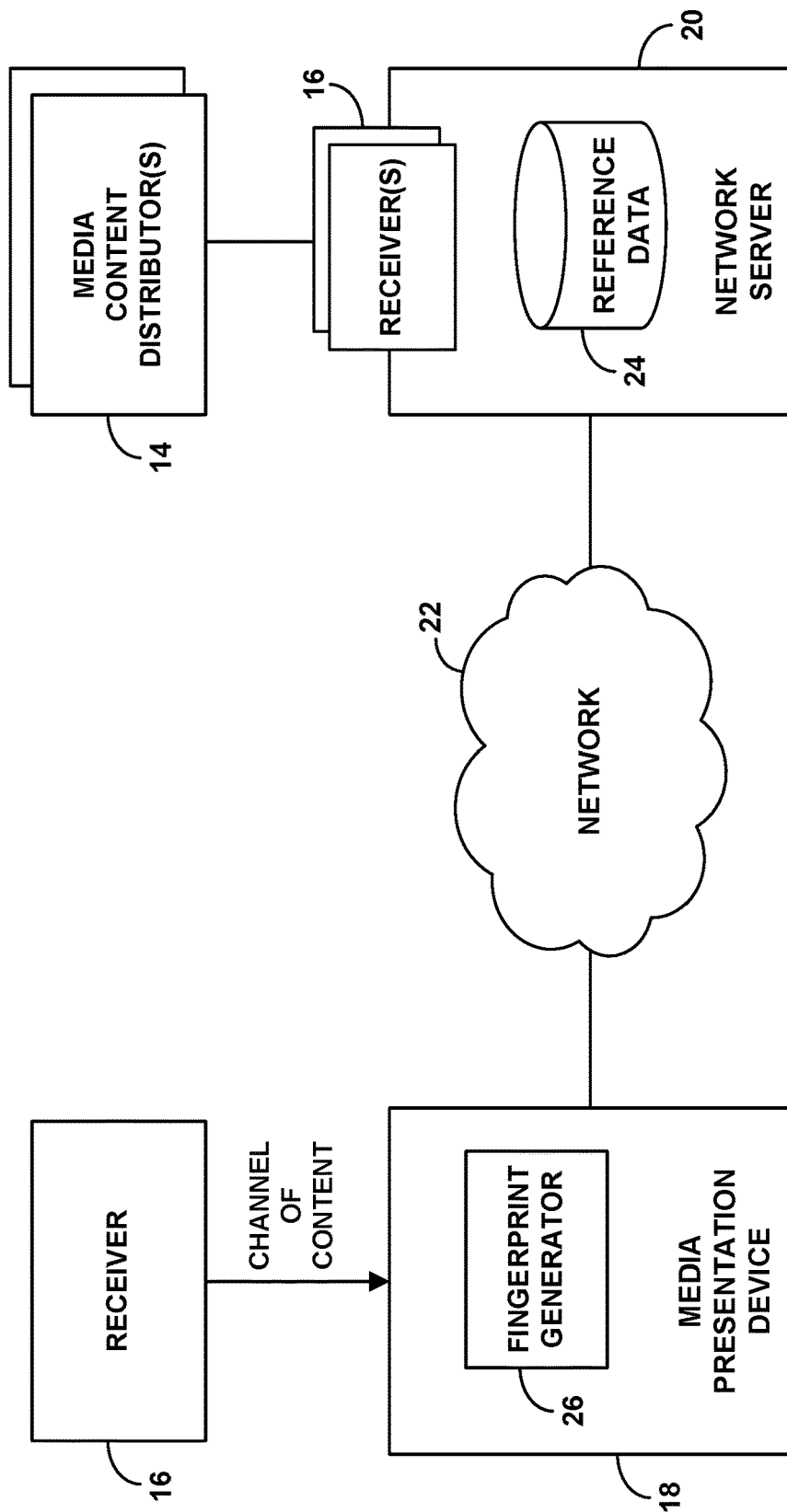
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to report a fingerprint of media content being rendered by the media presentation device, so as to facilitate channel identification and associated action.

As discussed above, the network server 20 or another entity operating in accordance with the present disclosure could establish or have access to reference data 24 for media content that is carried or scheduled to be carried on at least each of various channels accessible to the media presentation device 18. The reference data, which could be stored in a relational database or other form, could include a respective reference fingerprint for each channel, perhaps a reference fingerprint stream of media content that was most recently carried by the channel (e.g., on a sliding window basis covering a most recent period of time). Alternatively or additionally, the reference data could include a respective reference fingerprint (e.g., reference fingerprint stream) of each media content program (e.g., television broadcast, radio broadcast, streaming media file, etc.) that is available and/or scheduled to be carried on a particular channel. As such, the reference data could map each reference fingerprint to a channel on which the associated media content (i.e., the content uniquely identified by the reference fingerprint) is or may be carried.

In mapping reference fingerprints to channels, the reference data could characterize the channels by various attributes, to help distinguish the channels from each other. For example, where a receiver or other such device provides multiple different channels selectable by channel number, the reference data could characterize the channels by their respective channel numbers. And as another example, where each channel carries a particular content source's content, such as the content of one of a particular broadcaster for instance, the reference data could characterize the channels by their respective content sources' identities. Still further, where more than one content distributor (e.g., multichannel distributor) distribute content sources' content, the reference data could characterize the channels by their respective content distributors' identities. In practice, the reference data could correlate each reference fingerprint with one or more of these or other attributes.

The network server 20 or other entity operating in accordance with the present disclosure could establish some or all of this reference data by analyzing media content arriving on each of the various channels (e.g., at least the media content arriving on each of various channels that are available to a receiver that serves the media presentation device). To facilitate this, as shown, the server could include or be interconnected with one or more receivers 16 that are configured to receive media content from one or more of the media content distributors 14 on various channels in much the same way that receivers would be configured to receive content at customer premises. For instance, the server could include or be interconnected with one or more cable-TV set top boxes, radios, computers, or other media receivers, or could be configured to emulate one or more such receivers. The server could then be configured to receive and analyze the respective media content arriving on each channel and to generate for each channel a reference fingerprint of the channel's media content, using any media fingerprinting process now known or later developed (e.g., computing a hash on a per frame or other basis, or otherwise identifying, extracting and digitally representing component features unique to the media content).

In practice, the server could be configured to receive concurrently on multiple such channels (perhaps all of the channels) and to analyze and generate respective fingerprints for the channels in parallel, or the server might be configured to hop from channel to channel, possibly repeatedly cycling through the channels, to analyze and generate a respective fingerprint for each channel. Further, the server could continue to do this in real-time, saving a respective fingerprint of at least a most recent time window of media content for each channel, for reference. And the server could record each channel's reference fingerprint in the reference data in association with a characterization of the channel (e.g., with attributes such as those noted above) and timestamp information indicating a time of receipt of the associated media content. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each reference fingerprint.

Alternatively or additionally, the server could receive or perhaps establish such reference fingerprints for media content programs that are available or scheduled to be provided on particular channels. For instance, providers or distributors of various media content programs could generate reference fingerprints for the media content programs, again using any media fingerprinting process now known or later developed, and those reference fingerprints could be provided to the server. Alternatively, the server could receive advance copies of the media content programs and could itself generate such reference fingerprints. Further, the server could receive or determine from program guide information the channel on which the media content program is available or scheduled to be provided, and perhaps a day and time at which the media content is scheduled to be provided. The server could then record each media content program's reference fingerprint in the reference data in association with the channel on which the media content program is available or scheduled to be carried, likewise with associated channel attributes, and perhaps in association with a day and time at which the media content program is scheduled to be provided.

Given this or other such reference data, when the server is presented with a fingerprint of media content that was received on an unknown channel, the server could match the fingerprint with one of the stored reference fingerprints, using any fingerprint matching process now known or later developed, and could thereby conclude that the media content at issue arrived on the channel that the reference data maps to the matching reference fingerprint. Thus, if the server is faced with a fingerprint of media content that is being rendered by the media presentation device 18, the server could compare the fingerprint with the reference fingerprints in the reference data. And if the server thereby finds a matching reference fingerprint, then the server could identify the channel that the reference data maps with the matching reference fingerprint and could conclude that that is the channel on which the media presentation device is receiving the media content (i.e., that that is the channel carrying the media content being rendered by the media presentation device). In turn, the server could responsively take a channel-specific action based on the identified channel, or cause or enable one or more other entities to take a channel-specific action based on the identified channel.

To facilitate this, the media presentation device 18 or another entity could be configured to generate a fingerprint of the media content that is being rendered by the media presentation device and to transmit the fingerprint to server 20 for analysis.

For instance, as shown in FIG. 2, the media presentation device could include a fingerprint generator 26, which could be configured to generate a digital fingerprint of media content being rendered by the media presentation device. Such a fingerprint generator could be configured to generate the fingerprint of media content as the media presentation device is receiving the media content on a channel from a receiver 16 and/or as the media presentation device is processing the media content for presentation. As such, the fingerprint generator could receive as input a copy of the media content arriving at the media presentation device from the receiver and/or being processed for presentation by the media presentation device, and to apply any media fingerprinting process now known or later developed to generate a fingerprint of the media content.

In practice, the fingerprint generator could be configured to generate such a fingerprint as a fingerprint stream on an ongoing basis, such as on a per frame basis (e.g., per key-frame basis) or other basis. And the media presentation device could be configured to transmit the fingerprint via network 22 to a server 20 for analysis. By way of example, the media presentation device could be configured to periodically or from time to time transmit to the server a fingerprint representing a latest frame, series of frames or other segment or portion of the media content being rendered by the media presentation device. In particular, the media presentation device could generate a message carrying the latest generated fingerprint, along with one or more timestamps and/or other such data as well as an identifier of the media presentation device, and could transmit the message to the server's IP address. And the server may thereby receive the fingerprint for analysis.

Alternatively, the media presentation device could transmit to the server, and the server could thus receive, various data regarding the media content being rendered by the media presentation device, likewise on an ongoing basis or other basis, to enable the server itself or another entity to generate a fingerprint of the media content being rendered by the media presentation device. For example, the media presentation device could transmit to the server portions of the media content being rendered by the media presentation device, such as individual frames (e.g., snapshots) or other segments of the media content. And the server could apply any media fingerprinting process now known or later developed to generate a fingerprint of the media content for analysis.

Through the process described above, the server could then compare the fingerprint of the media content being rendered by the media presentation device with the reference fingerprints in the reference data, using any digital fingerprint comparison process now known or later developed. And as noted above, if the server thereby finds a matching reference fingerprint, the server could determine the channel that the reference data maps with the matching reference fingerprint and could conclude that the determined channel is the channel carrying the media content being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server a fingerprint of the media content that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented. Further, these counts or other statistics could be per media presentation device (as device-specific viewing analytics), indicating the extent to which the media presentation device presents the channel at issue.

As another example, the server could responsively cause the media presentation device to present supplemental content, such as a pop-up advertisement as discussed above, a commercial break, or a channel identification, among other possibilities, possibly as a replacement for one or more portions of the media content. For instance, given knowledge of the channel at issue, the server could generate or select (e.g., from server data storage) particular supplemental media content associated specifically with the determined channel (and perhaps further based on profile data (e.g., device-specific viewing analytics) associated with the particular media presentation device) and could transmit the supplemental media content to the media presentation device for the media presentation device to present in conjunction with the media content that the media presentation device is receiving from the receiver. The media presentation device could thus receive the supplemental media content from the server and present it in conjunction with the media content that the media presentation device is receiving from the receiver.

In practice, this process could involve the server receiving in real-time from the media presentation device a fingerprint of the media content being rendered by the media presentation device and the server determining that the received fingerprint matches a reference fingerprint of media content that the server is concurrently receiving (or has scheduled for the same time) on a known channel.

In some cases, however, there may be a time difference between when the media presentation device renders the media content and timestamps and transmits the fingerprint to the server and when the server receives the media content on the known channel and otherwise has the reference fingerprint timestamped. The server could account for this time difference by comparing the received fingerprint over a sliding window of the reference fingerprint or vice versa. Further, the server could account for this time difference when taking action in response to a determined match between the received fingerprint and the reference fingerprint. For example, if the media presentation device receives the media content sufficiently earlier than the server's timestamp for the content (e.g., more than a few seconds earlier), the server could still identify a fingerprint match and could record analytics data. But in response to detecting that time difference, the server might forgo having the media presentation device present associated supplemental content, to help avoid a situation where the media presentation device presents the supplemental content too late (e.g., out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 20 or other entity that has access to reference data as noted above could be configured to identify multi-match scenarios, perhaps by detecting among the reference data various reference fingerprints that match each other and that match a fingerprint of media content being rendered by the media presentation device.

In one implementation, for instance, the server could regularly analyze the reference data in search of multi-match scenarios, comparing pairs of reference fingerprints in the reference data using any now known or later developed media fingerprint matching process, in an effort to find reference fingerprints that match each other. Upon finding each such match of at least two of the reference fingerprints, the server could then flag the reference fingerprints as being a multi-match group. Such a flag could indicate that there will be a potential ambiguity if the fingerprint of media content being rendered by the media presentation device matches any of the reference fingerprints in the flagged multi-match group. The server could flag the reference fingerprints as being a multi-match group in various ways. For instance, the server could cross-reference the reference fingerprints of the multi-match group in the reference data, to indicate that they are members of a multi-match group. Alternatively, the server could store a single copy of the reference fingerprint and associate that copy with various channels on which the media content represented by the reference fingerprint is carried.

With this implementation, when the server receives from a media presentation device a fingerprint of media content being rendered by the media presentation device and the server determines that the received fingerprint matches a reference fingerprint, the server could then readily determine from the reference data whether a multi-match situation exists. If the matching reference fingerprint is not flagged as being a member of a multi-match group, then the server could conclude that a single-match situation (rather than a multi-match situation) exists, in which case, as discussed above, the server could then readily determine from the reference data the channel associated with the matching reference fingerprint and could conclude that that is the channel carrying the media content being rendered by the media presentation device. Whereas, if the matching reference fingerprint is flagged as being a member of a multi-match group, then the server could conclude that a multi-match situation (rather than a single-match situation) exists, in which case the server may need to perform a disambiguation process to help identify the channel at issue from among those associated with the reference fingerprints of the multi-match group.

Alternatively, in another implementation, the server could identify a multi-match group at the time the server receives a fingerprint from the media presentation device. For instance, when (e.g., as) the server receives the fingerprint from the media presentation device, the server could compare the received fingerprint with all of the reference fingerprints in the reference data. If the server thereby detects that the received fingerprint matches only one of the reference fingerprints, then the server could conclude that a single-match situation (rather than a multi-match situation) exists, in which case the server could then readily determine from the reference data the channel associated with the matching reference fingerprint and could conclude that that is the channel carrying the media content being rendered by the media presentation device. Whereas, if the server detects that the received fingerprint matches two or more of the reference fingerprints, then the server could conclude that a multi-match situation (rather than a single-match situation) exists, in which case the server may need to perform a disambiguation process to help identify the channel at issue from among those associated with the reference fingerprints of the multi-match group.

Note that the process of detecting a multi-match situation involving two or more reference fingerprints could be performed even if the two reference fingerprints represent the same media content carried on two different channels at a time delay relative to one another, i.e., where the presentation of the media content on one of the channels is time shifted in relation to presentation of the same media content on another one of the channels. The fingerprint matching process could account for this time shifting and could still find a match if the fingerprints otherwise match each other, such as by comparing one fingerprint over a sliding window with the other fingerprint. For instance, the process of finding matching reference fingerprints within the reference data could involve searching for reference fingerprints that match one another and are presented and/or scheduled at respective times that are within a threshold time interval of each other.

As noted above, when the server or other entity carrying out this analysis detects that the fingerprint of the media content being rendered by the media presentation device matches multiple reference fingerprints corresponding with multiple channels, the entity could apply a disambiguation process to help determine which of the channels associated with the multi-match group is the actual channel carrying the media content being rendered by the media presentation device.

In accordance with the present disclosure, the disambiguation process can be based on a further determination that a portion of the received fingerprint, or a fingerprint of a portion of the media content being rendered, represents channel-distinguishing content specific to just one of the multi-match group members. In particular, although a comparison of fingerprints may establish that the received fingerprint generally matches each fingerprint of the multi-match group, a further comparison (of a portion before or after) could establish that the received fingerprint matches just one of the reference fingerprints, thereby supporting a conclusion that that the channel corresponding with that one reference fingerprint is the channel carrying the media content being rendered by the media presentation device.

In an example implementation, for instance, the server may receive over time from the media presentation device a sequence of fingerprint segments representing a corresponding sequence of segments of media content being rendered by the media presentation device. As the server receives those fingerprint segments from the media presentation device, the server may compare the received fingerprint segments with segments of the reference fingerprints and thereby detect a multi-match scenario, because the same media content is carried on the channel being received by the media presentation device and on the channels associated with the members of the multi-match group. To resolve this multi-match scenario, the server may then determine that one or more others of the received fingerprint segments match just a single one of the multi-match group reference fingerprints, perhaps because a commercial break, news programming, or content being rendered by the media presentation device is specific to the channel at issue and is present in just a single one of the channels associated with members of the multi-match group.

Figure 3:
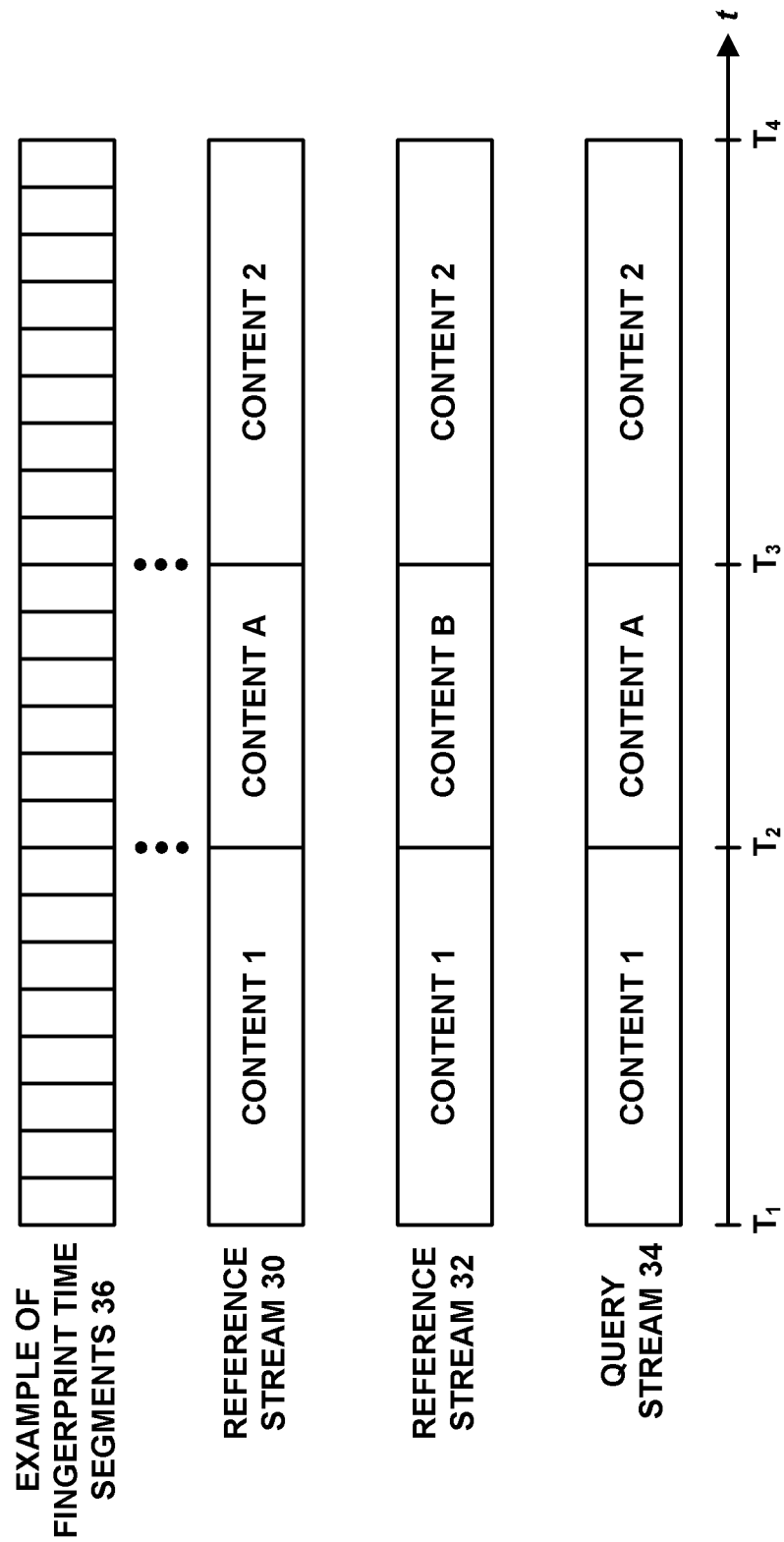
FIG. 3 is a timing diagram illustrating multiple reference streams, a query media stream, and fingerprint timeslots.

FIG. 3 is a timeline illustration of several media streams and fingerprint timeslots to help explain how this could work in practice. In particular, FIG. 3 depicts two reference media streams 30, 32 and one query media stream 34, and example fingerprint timeslots 36. Reference media streams 30, 32 could be media streams carried on respective known channels, and query media stream 34 could be a media stream received and rendered by media presentation device 18 on an unknown channel. Fingerprint timeslots 36 could then represent time segments for which fingerprints of the respective media streams could be generated, on a sliding window basis for instance. In a representative implementation, server 20 may thus store reference fingerprint data defining a sequence of fingerprints or fingerprint segments over the course of each reference media stream. And server 20 may receive from media presentation device 18 query fingerprint data defining a sequence of fingerprints or fingerprint segments over the course of the media stream being rendered by the media presentation device.

In the example shown in FIG. 3, both of the reference media streams 30, 32 include the same content as each other, "CONTENT 1," from time $T_1$ to time $T_2$ and also include the same content as each other, "CONTENT 2," from time $T_3$ to time $T_4$. However, from time $T_2$ to time $T_3$, the reference media streams 30, 32 include different content than each other, with reference media stream 30 including "CONTENT A" and reference media stream 32 including "CONTENT B". An example of this arrangement could be where "CONTENT 1" and "CONTENT 2" are portions of programming that is simulcast on two separate channels as media streams 30, 32, but where, from time $T_2$ to $T_3$, the channels carry different commercial breaks or news programs than each other, one channel carrying "CONTENT A" and the other channel carrying "CONTENT B".

As further shown by way of example in FIG. 3, from time $T_1$ to time $T_2$ and from time $T_3$ to time $T_4$, the query media stream 34 includes content ("CONTENT 1" and "CONTENT 2") that matches the content of both reference media streams 30, 32. Thus, a comparison of the query fingerprint data with the reference fingerprint data with respect to time range $T_1$-$T_2$ and/or time range $T_3$-$T_4$ (possibly accounting for time shifting) could lead the server to detect a multi-match situation, because the fingerprint data representing the query media stream 34 would match the fingerprint data representing both of the reference media streams 30, 32.

As additionally shown, however, from time $T_2$ to time $T_3$, the query media stream 34 includes content ("CONTENT A") that matches the content of reference media stream 30 but that does not match the content of reference media stream 32. Thus, a comparison of the query fingerprint data with the reference fingerprint data with respect to time range $T_2$-$T_3$ could lead the server to detect a single-match situation among the multi-match group members, because the fingerprint data representing the query media stream would match the fingerprint data representing reference media stream 30 but would not match the fingerprint data representing reference media stream 32.

In accordance with the present disclosure, as the server 20 receives the query fingerprint data from the media presentation device, the server may thus detect a multi-match situation based on a comparison of one or more segments of the query fingerprint data (representing one or more segments of the media content being rendered by the media presentation device) with one or more segments of the reference fingerprint data. But the server may further detect a single-match situation based on a comparison of one or more other segments of the fingerprint data (representing one or more other segments of media content being rendered by the media presentation device) with one or more other segments of the reference fingerprint data. And the server may use the detected single-match situation as a basis to disambiguate the multi-match situation, so as to determine which channel carries the media content being rendered by the media presentation device.

In an example implementation, for instance, if the server receives from the media presentation device fingerprint data that the media presentation device generates for sequential time segments of the media content being rendered by the media presentation device, then the server may determine that the received fingerprint data representing a first one or more such time segments indicates a multi-match situation, as there are two or more reference fingerprints that match the received fingerprint. Moving along in time, however, the server may then determine that the received fingerprint data representing a next one or more such time segments matches just one of the reference fingerprints of the multi-match group, since at this point in time, the channels are providing different content (e.g., different local commercials or news programming) than each other. Based on this analysis of the fingerprints, the server may thereby conclude that the received fingerprint matches just that one reference fingerprint, and the server may conclude that the channel that the reference data maps with that one reference fingerprint is the channel on which the media presentation device is receiving the media content.

Continuing in time, the server may then detect that the received fingerprint data representing still a next one or more time segments of the media content again matches two or more of the reference fingerprints. However, given that the server had already identified the channel at issue based on the inclusion of the channel-distinguishing content, the server may retain that conclusion. In this way, the server may effectively use a single-match history for one of the channels of a multi-match group as a basis to disambiguate an earlier or later multi-match situation for query fingerprints received from the same media presentation device.

In practice, the reliability of this process may depend on how much time has passed between detecting the single-match and detecting the multi-match. If only several seconds or possibly only several minutes have passed, then basing the channel identification on the single-match may be more reliable than if, say, an hour or so has passed. Further, the server could also perform other analysis to determine that the channel-distinguishing content (e.g., local commercial) was within or associated with the same media content program currently being analyzed, which could additionally justify consideration of that single-match as a basis to disambiguate a multi-match.

Considered another way, this process may thus involve the server detecting for the received fingerprint data a single-match followed by a multi-match, and the server using the single-match as a basis to disambiguate the multi-match; and/or the process may involve the server detecting for the received fingerprint data a multi-match followed by a single-match, and the server using the single-match as a basis to disambiguate the multi-match. Further, the process may involve the server detecting for the received fingerprint data a multi-match, followed by a single-match, and then followed again by a multi-match, and the server using the intervening single-match as a basis to disambiguate the earlier and/or later multi-match. In this process, the single-match could be due to inclusion of a channel-distinguishing content such as local commercial or news programing content, among other possibilities.

In a specific example implementation, if the server has pre-established a multi-match group of reference fingerprints as discussed above, the server could evaluate the pre-established multi-match group and identify one or more time segments that differ between members of the group, so as to facilitate the present disambiguation process. For instance, if the multi-match group members are fingerprints representing reference media streams 30, 32 of FIG. 3, the server could further compare the reference fingerprints and determine that they differ from each other during the period $T_2$ to $T_3$. The server could then flag that time period of the multi-match group as representing a difference between the multi-match group members. And when the server later detects that a query fingerprint from the media presentation device matches both of those reference fingerprints, the server could specifically consider time period $T_2$ to $T_3$, to determine which reference fingerprint the query fingerprint matches, and to facilitate multi-match disambiguation.

Further still, upon determining the time period of channel-distinguishing content (e.g., the period $T_2$ to $T_3$) among multi-match group members, the server could flag that time period (e.g., the start of the period, $T_2$) as a time period when disambiguation could be performed. As such, when the server then detects a multi-match situation with respect to the multi-match group, the server could determine the timing of a next-occurring instance of channel-distinguishing content for the channels involved, and the server could instruct the media presentation device to provide a query fingerprint representing that time-portion of the media content. The server could thus receive from the media presentation device the query fingerprint for that time-portion of the media content and could use that query fingerprint as a basis to perform disambiguation and thus to resolve the multi-match situation.

Alternatively, the server could receive, establish, or otherwise obtain reference fingerprints specifically for channel-distinguishing content (such as local commercial content or news programming) corresponding with respective known channels and could use that reference fingerprint data as a basis to detect a single-match situation that could serve to disambiguate a multi-match situation. For instance, the server could be provided with a commercial or news program that is specific to just a single channel (e.g., that is scheduled to air on just a single channel), and the server could generate a reference fingerprint of that commercial or news program and store it in reference data 24 along with an indication of the single associated channel. Or the server could receive and store such a reference fingerprint along with an indication of the single associated channel. The server could then compare a received query fingerprint with the reference fingerprint of that channel-distinguishing content and thereby detect a single-match, so as to facilitate multi-match disambiguation.

Note that while the discussion herein focuses primarily on server 20 identifying a multi-match situation and then disambiguating based on consideration of context, some or all of the operations described could alternatively be carried out by one or more other entities, in place of or in cooperation with the server.

For instance, one or more of the operations could be carried out by the media presentation device itself or by an adjunct system in local communication with the media presentation device. By way of example, the media presentation device itself could be provisioned with or have access to reference data like that described above, and the media presentation device could itself refer to the reference data to identify a multi-match situation, to disambiguate, and to identify the channel that provides the media content being rendered by the media presentation device. Further, for efficiency, the media presentation device could be provided with a set of reference data specifically for the group of channels that match a query fingerprint (e.g., in response to the server detecting a multi-match situation involving those channels), and the media presentation device could then perform disambiguation itself by making comparisons between such reference data and subsequently derived query fingerprints. Still further, the media presentation device could then itself take channel-specific action, such as presenting channel-specific content, recording channel presentation, or the like, or could cause one or more other entities to take such action.

In addition, while the foregoing discussion mentions commercial content and news programming as examples of channel-distinguishing content that could help facilitate multi-match disambiguation, other examples are possible as well. For instance, if the channel being rendered by the media presentation device includes multiple tracks, such as a video track and an audio track, the multi-match might be with respect to one of the tracks but the single-match that facilitates multi-match disambiguation might be with respect to another one of the tracks.

As a specific example of this, the server might detect a video multi-match situation by detecting that a fingerprint of video content being rendered by the media presentation device matches multiple reference fingerprints corresponding respectively with multiple channels. But the server might further detect a single-match situation by detecting that a fingerprint of audio content being rendered by the media presentation device matches just one reference fingerprint corresponding with just a single one of the multiple channels. As a result, the server could conclude that the single channel is the channel that the media presentation device is rendering, so as to facilitate taking channel-specific action.

Figure 4:
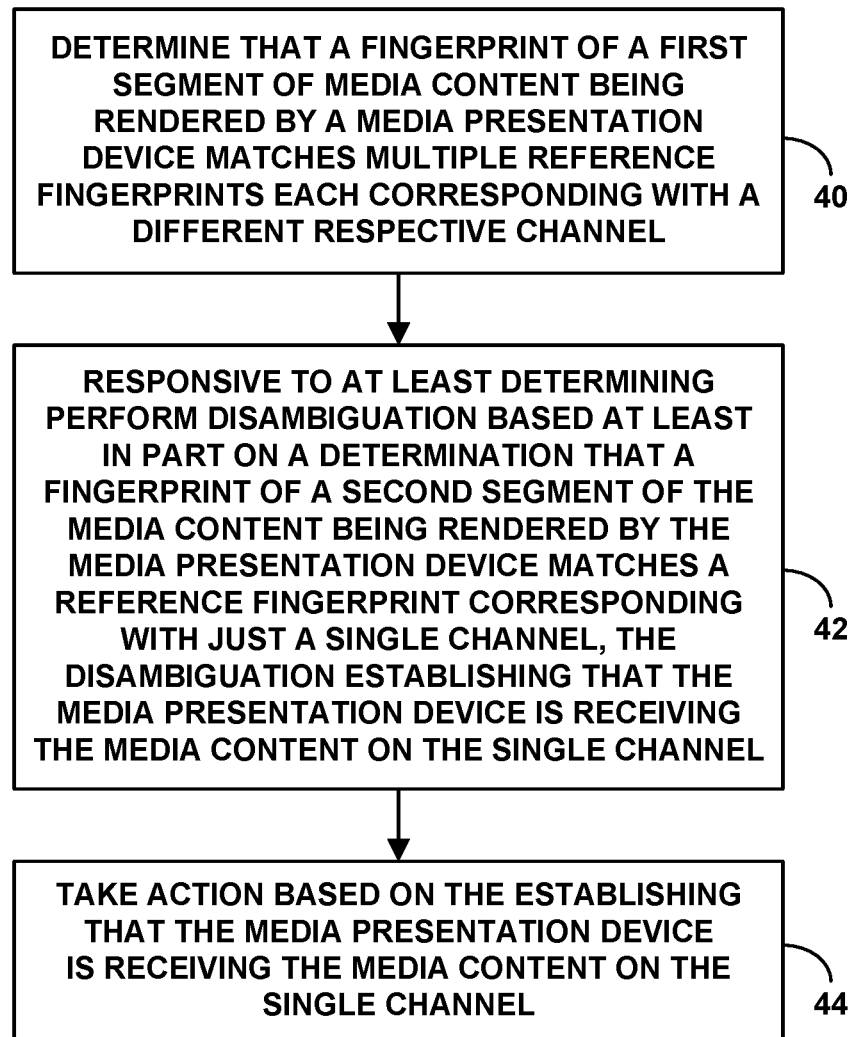
FIG. 4 is a flow chart depicting operations that can be carried out in accordance with the present disclosure.

FIG. 4 is next a flow chart depicting a method that can be carried out in line with the discussion above. One or more of the operations in the method depicted by FIG. 4 could be carried out by one or more entities, including, without limitation, a network server, a media presentation device, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 4, at block 40, the method includes a computing system determining that a fingerprint of a first segment of media content being rendered by a media presentation device matches multiple reference fingerprints each corresponding with a different respective channel. At block 42, the method then includes, responsive to at least determining that the fingerprint of the first segment matches the multiple reference fingerprints each corresponding with a different respective channel, performing disambiguation based at least in part on a determination that a fingerprint of a second segment of the media content being rendered by the media presentation device matches a reference fingerprint corresponding with just a single channel, the disambiguation establishing that the media presentation device is receiving the media content on the single channel. And at block 44, the method includes taking action based on the establishing that the media presentation device is receiving the media content on the single channel.

As discussed above, where the computing system is a server or other entity other than the media presentation device, the media presentation device could generate the first and second segments of the media content being rendered by the media presentation device, and the computing system could receive those fingerprints from the media presentation device.

Further, in an example implementation, the multiple reference fingerprints could be selected from a plurality of reference fingerprints in reference data, in which case determining that the fingerprint of the first segment of the media content being rendered by the media presentation device matches the multiple reference fingerprints could involve (i) comparing the fingerprint of the first segment of media content being rendered by the media presentation device with the plurality of reference fingerprints in the reference data, and (ii) based on the comparing, determining that the fingerprint of the first segment of the media content being rendered by the media presentation device matches the multiple reference fingerprints.

Still further, the method could also include detecting and flagging a multi-match group comprising the multiple reference fingerprints, in which case the act of determining that the fingerprint of the first segment of the media content being rendered by the media presentation device matches the multiple reference fingerprints could involve determining that the fingerprint of the first segment of the media content being rendered by the media presentation device matches the reference fingerprints of the flagged multi-match group.

Also in line with the discussion above, the method could include making the determination that the fingerprint of the second segment of the media content being rendered by the media presentation device matches a reference fingerprint corresponding with just a single channel. For instance, the method could include (i) comparing the fingerprint of the second segment of the media content being rendered by the media presentation device with at least each of reference fingerprint of the multiple reference fingerprints, and (ii) based on the comparing, determining that the fingerprint of the second segment of the media content being rendered by the media presentation device matches just a single one of the multiple reference fingerprints.

In addition, the reference fingerprint corresponding with just a single channel could be or include a reference fingerprint representing channel-distinguishing content specific to the single channel, in which case the act of making the determination that the fingerprint of the second segment of the media content being rendered by the media presentation device matches a reference fingerprint corresponding with just a single channel could involve comparing the fingerprint of the second segment of the media content being rendered by the media presentation device with the reference fingerprint representing that channel-distinguishing content.

Further, as also discussed above, the first and second segments of the media content being rendered by the media presentation device could be first and second respective time segments of the media content being rendered by the media presentation device. And the first time segment could be before the second time segment, or the second time segment could be before the first time segment.

And as additionally discussed above, the action taken based on the establishing that the media presentation device is receiving the media content on the single channel could include (i) causing supplemental channel-specific content to be presented in conjunction with the media content being rendered by the media presentation device, and/or (ii) recording presentation of the single channel for use in a channel ratings system, or could take other forms.

Figure 5:
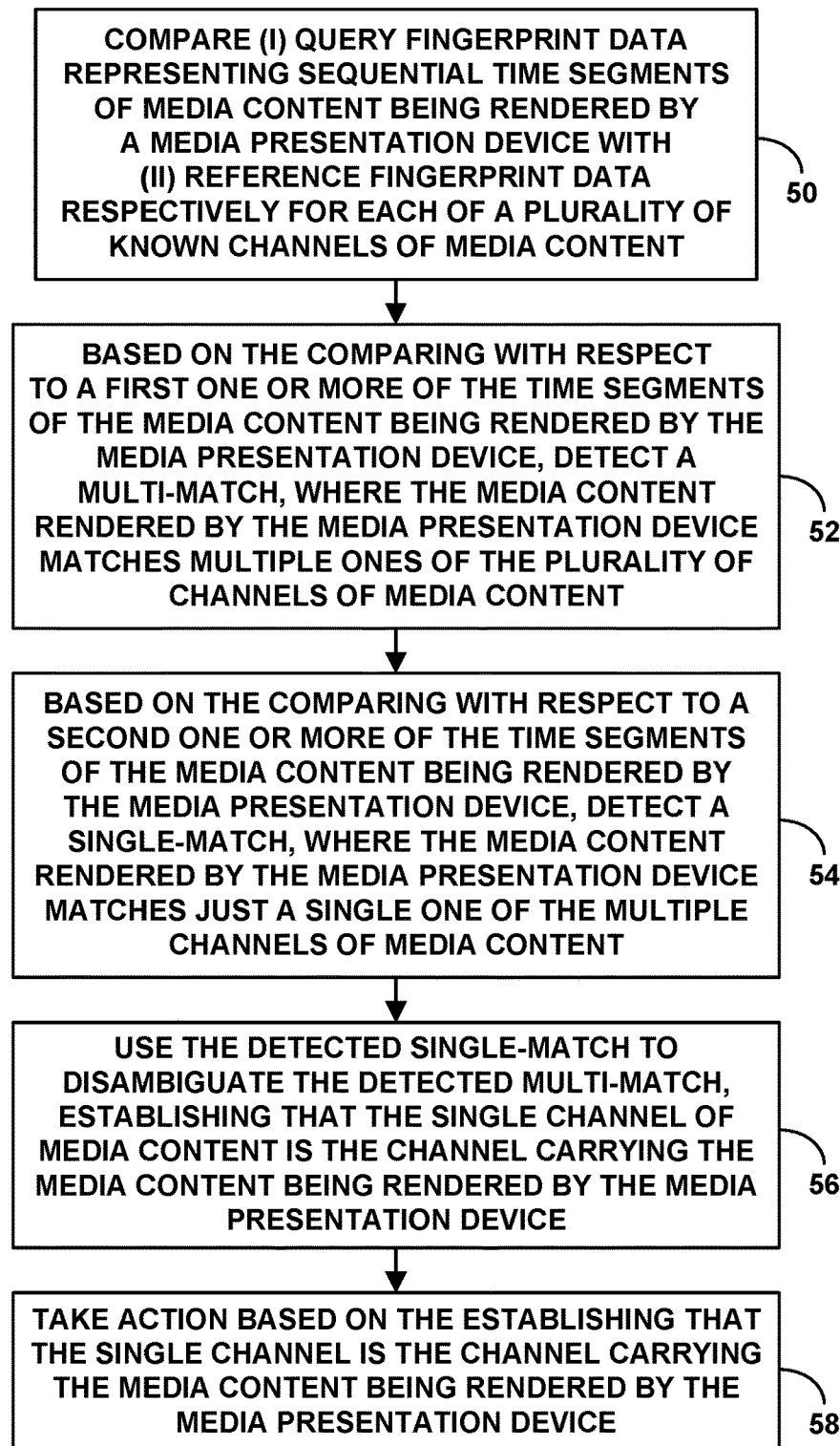
FIG. 5 is another flow chart depicting operations that can be carried out in accordance with the present disclosure.

FIG. 5 is next another flow chart depicting a method that can be carried out in line with the discussion above, which could similarly be implemented by one or more entities and/or embodied on a non-transitory data storage as discussed above.

As shown in FIG. 5, at block 50, the method includes a computing system comparing (i) query fingerprint data representing sequential time segments of media content being rendered by a media presentation device with (ii) reference fingerprint data respectively for each of a plurality of known channels of media content. And at block 52, the method includes, based on the comparing with respect to a first one or more of the time segments of the media content being rendered by the media presentation device, the computing system detecting a multi-match, where the media content rendered by the media presentation device matches multiple ones of the plurality of channels of media content. Further, at block 54 (which could occur before block 52), the method includes, based on the comparing with respect to a second one or more of the time segments of the media content being rendered by the media presentation device, the computing system detecting a single-match, where the media content rendered by the media presentation device matches just a single one of the multiple channels of media content.

At block 56, the method then includes the computing system using the detected single-match to disambiguate the detected multi-match, establishing that the single channel of media content is the channel carrying the media content being rendered by the media presentation device. And at block 58, the method includes taking action based on the establishing that the single channel is the channel carrying the media content being rendered by the media presentation device.

Features discussed above can be applied in this method as well, and vice versa. For instance, the single-match could be with respect to media content selected from the group consisting of commercial content and news programming. And each of the first one or more time segments could be before each of the second one or more time segments, or each of the second one or more time segments could be before each of the first one or more time segments. Further, the action taken based on the establishing that the single channel is the channel carrying the media content being rendered by the media presentation device could take various forms as discussed above. And the method could be carried out at least in part by the media presentation device, such as with the media presentation device accessing reference data for the multiple channels to facilitate disambiguating the multi-match as discussed above.

Figure 6:
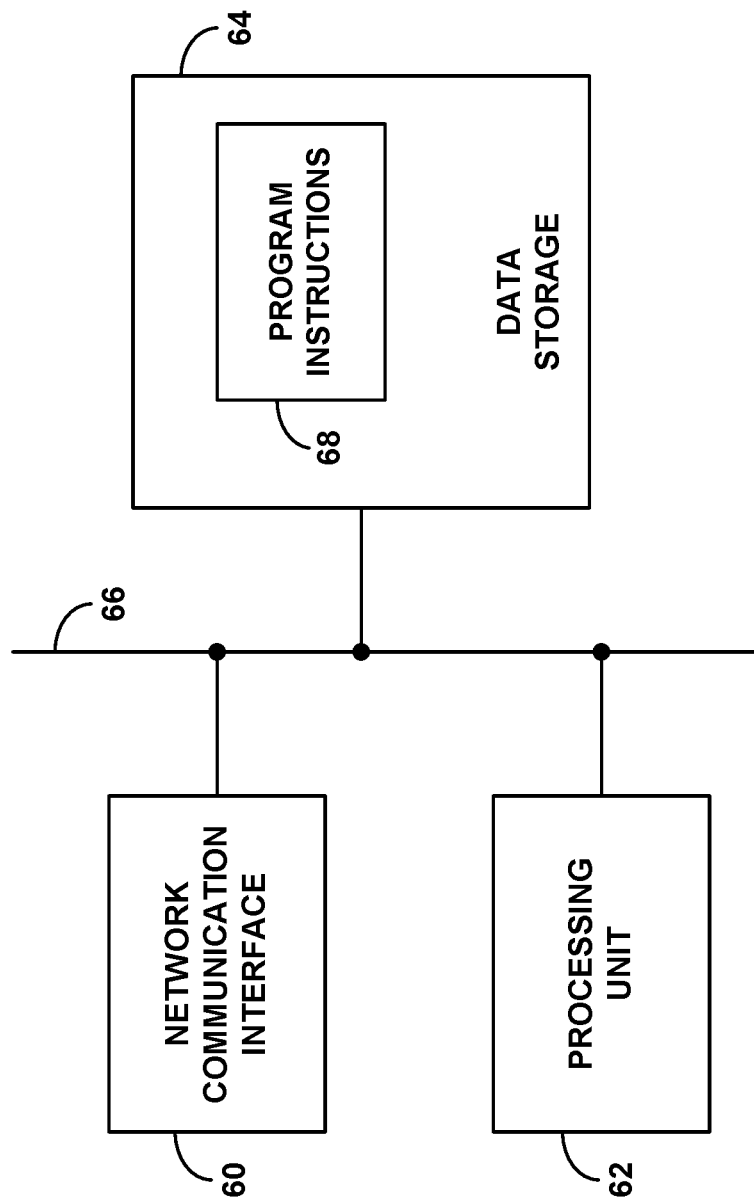
FIG. 6 is a simplified block diagram of an example network server.

FIG. 6 is next a simplified block diagram of an example system operable in accordance with the present disclosure. This system could represent a network server as described above, and/or one or more other entities (possibly including the media presentation device). As shown in FIG. 6, the example system includes a network communication interface 60, a processing unit 62, non-transitory data storage 64, any or all of which could be integrated together or, as shown, communicatively linked together by a system bus, network, or other connection mechanism 66.

Network communication interface 60 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 62, could then comprise one or more general purpose processors (e.g., microprocessors) and/or one or more specialized processors (e.g., application specific integrated circuits). And non-transitory data storage 64 could comprise one or more volatile and/or non-volatile storage components, such as optical, magnetic, or flash storage.

As shown, data storage 64 then stores program instructions 68, which could be executable by processing unit 62 to carry out various operations described herein. For example, the program instructions could be executable to (i) receive from a media presentation device, via the network communication interface, a fingerprint of media content being rendered by the media presentation device, (ii) determine that the received fingerprint matches multiple reference fingerprints each corresponding with a different respective channel, (iii) responsive to determining that the received fingerprint matches the multiple reference fingerprints each corresponding with a different respective channel, perform disambiguation based at least in part on a determination that a segment of the received fingerprint matches a reference fingerprint corresponding with just a single channel, the disambiguation establishing that the single channel carries the media content being rendered by the media presentation device, and (iv) take action based on the establishing that the single channel carries the media content being rendered by the media presentation device. Various features described above could be applied in this context as well.

Figure 7:
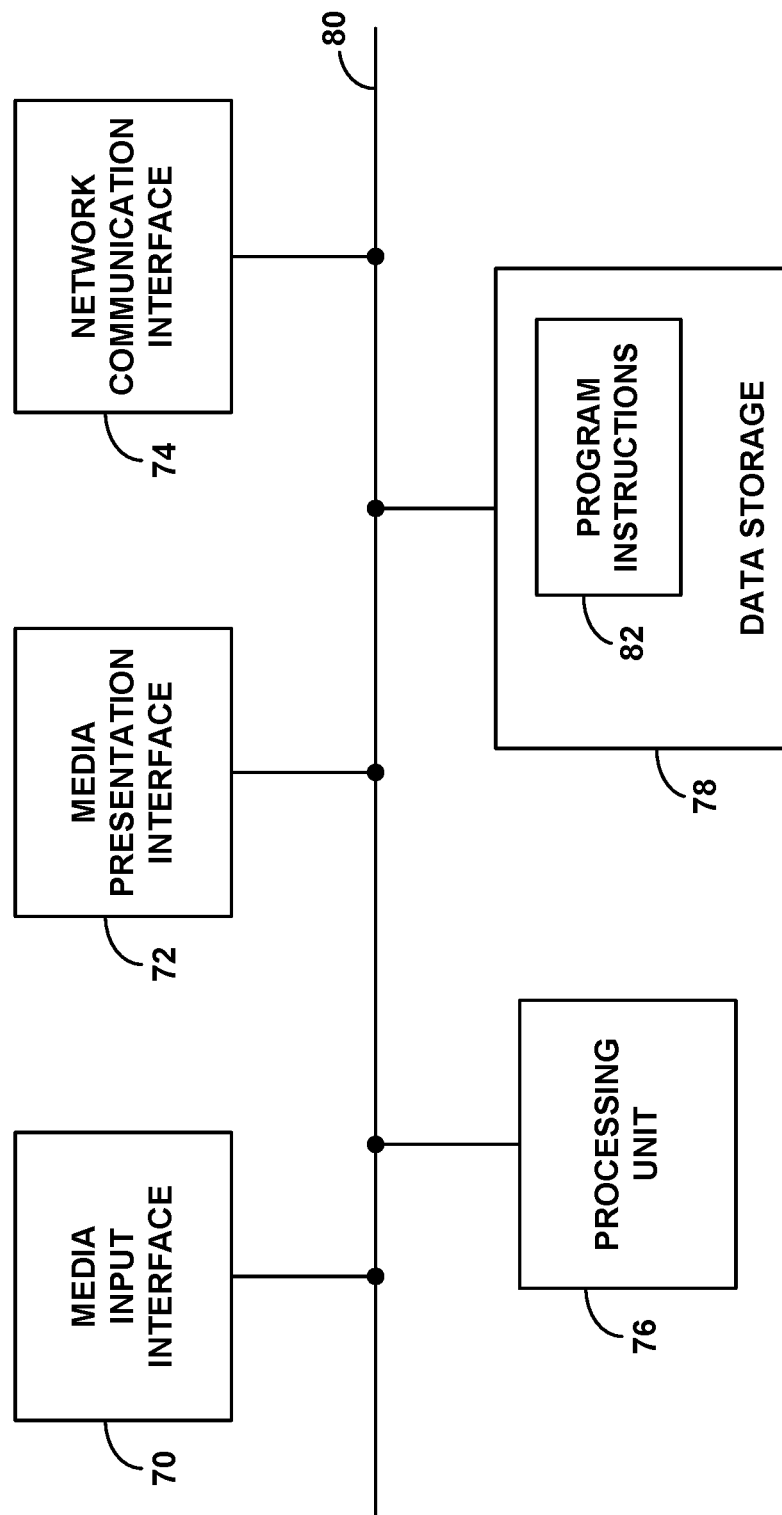
FIG. 7 is a simplified block diagram of an example media presentation device.

Finally, FIG. 7 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 7, the example media presentation device includes a media input interface 70, a media presentation interface 72, a network communication interface 74, a processing unit 76, and non-transitory data storage 78, any or all of which could be integrated together or, as shown, communicatively linked together by a system bus, network, or other connection mechanism 80.

Media input interface 70 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 72 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 74 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 76 could then comprise one or more general purpose processors (e.g., microprocessors) and/or one or more specialized processors (e.g., application specific integrated circuits). And non-transitory data storage 78 could comprise one or more volatile and/or non-volatile storage components, such as optical, magnetic, or flash storage. Further, as shown, data storage 78 stores program instructions 82, which could be executable by processing unit 76 to carry out various operations described here. For example, the program instructions could be executable to generate on an ongoing basis a fingerprint of media content being rendered by the media presentation device, based on analysis of the media content being received at the media input interface 70 and/or being processed at the media presentation interface, and to provide the generated fingerprint on an ongoing basis to facilitate channel identification as described herein.

Exemplary embodiments have been described above. Those skilled in the art will understand, however, that changes and modifications may be made to these embodiments without departing from the true scope and spirit of the invention.

What is claimed is:

1. A non-transitory computer readable medium having stored thereon instructions executable by a processing unit to carry out operations comprising:

determining that a digital fingerprint of a first segment of media content being rendered by a media presentation device matches multiple reference fingerprints each corresponding with a different respective channel;

after determining that the digital fingerprint of the first segment matches the multiple reference fingerprints each corresponding with a different respective channel, performing disambiguation based at least in part on an earlier determination that a digital fingerprint of a second segment of the media content being rendered by the media presentation device matches a reference fingerprint corresponding with just a single channel, the disambiguation establishing that the media presentation device is receiving the media content on the single channel, wherein the first and second segments of the media content being rendered by the media presentation device are first and second respective time segments of the media content being rendered by the media presentation device, wherein the second time segment is before the first time segment, and taking action based on the establishing that the media presentation device is receiving the media content on the single channel.

2. The non-transitory computer readable medium of claim 1, wherein the second segment of the media content being rendered by the media presentation device comprises content selected from the group consisting of commercial content and news programming.

3. The non-transitory computer readable medium of claim 1, wherein the digital fingerprints of the first and second segments of the media content being rendered by the media presentation device are generated by the media presentation device, the operations further including:

receiving, from the media presentation device, the digital fingerprints of the first and second segments of the media content being rendered by the media presentation device.

4. The non-transitory computer readable medium of claim 1, wherein the multiple reference fingerprints are selected from a plurality of reference fingerprints in reference data, and wherein determining that the fingerprint of the first segment of the media content being rendered by the media presentation device matches the multiple reference fingerprints comprises:

comparing the digital fingerprint of the first segment of media content being rendered by the media presentation device with the plurality of reference fingerprints in the reference data, and based on the comparing, determining that the digital fingerprint of the first segment of the media content being rendered by the media presentation device matches the multiple reference fingerprints.

5. The non-transitory computer readable medium of claim 1, wherein the operations further include detecting and flagging a multi-match group comprising the multiple reference fingerprints, wherein determining that the digital fingerprint of the first segment of the media content being rendered by the media presentation device matches the multiple reference fingerprints comprises determining that the digital fingerprint of the first segment of the media content being rendered by the media presentation device matches the reference fingerprints of the flagged multi-match group.

6. The non-transitory computer readable medium of claim 1, wherein the operations further include making the determination that the digital fingerprint of the second segment of the media content being rendered by the media presentation device matches a reference fingerprint corresponding with just the single channel, wherein making the determination comprises:

comparing the digital fingerprint of the second segment of the media content being rendered by the media presentation device with at least each of reference fingerprint of the multiple reference fingerprints, and based on the comparing, determining that the digital fingerprint of the second segment of the media content being rendered by the media presentation device matches just a single one of the multiple reference fingerprints.

7. The non-transitory computer readable medium of claim 1, wherein the reference fingerprint corresponding with just the single channel comprises a reference fingerprint representing channel-distinguishing content specific to the single channel, the operations further including:

making the determination that the digital fingerprint of the second segment of the media content being rendered by the media presentation device matches the reference fingerprint corresponding with just the single channel, wherein making the determination comprises comparing the digital fingerprint of the second segment of the media content being rendered by the media presentation device with the reference fingerprint representing the channel-distinguishing content.

8. The non-transitory computer readable medium of claim 1, wherein taking action based on the establishing that the media presentation device is receiving the media content on the single channel comprises causing supplemental channel-specific content to be presented in conjunction with the media content being rendered by the media presentation device.

9. The non-transitory computer readable medium of claim 1, wherein taking action based on the establishing that the media presentation device is receiving the media content on the single channel comprises recording presentation of the single channel for use in a channel ratings system.

10. A non-transitory computer readable medium having stored thereon instructions executable by a processing unit to carry out operations comprising:

comparing (i) query digital fingerprint data representing sequential time segments of media content being rendered by a media presentation device with (ii) reference fingerprint data respectively for each of a plurality of known channels of media content, based on the comparing with respect to a first one or more of the time segments of the media content being rendered by the media presentation device, detecting a multi-match, where the media content rendered by the media presentation device matches multiple ones of the plurality of channels of media content, based on the comparing with respect to a second one or more of the time segments of the media content being rendered by the media presentation device, detecting a single-match, where the media content rendered by the media presentation device matches just a single one of the multiple channels of media content, wherein each of the second time one or more segments is before each of the first one or more time segments, using the detected single-match to disambiguate the detected multi-match, establishing that the single channel of media content is the channel carrying the media content being rendered by the media presentation device, and taking action based on the establishing that the single channel is the channel carrying the media content being rendered by the media presentation device.

11. The non-transitory computer readable medium of claim 10, wherein the single-match is with respect to media content selected from the group consisting of commercial content and news programming.

12. The non-transitory computer readable medium of claim 10, wherein taking action based on the establishing that the single channel is the channel carrying the media content being rendered by the media presentation device comprises causing supplemental channel-specific content to be presented in conjunction with the media content being rendered by the media presentation device.

13. The non-transitory computer readable medium of claim 10, wherein taking action based on the establishing that the single channel is the channel carrying the media content being rendered by the media presentation device comprises recording presentation of the single channel for use in a channel ratings system.

14. The non-transitory computer readable medium of claim 9, wherein the query digital fingerprint data representing sequential time segments of media content being rendered by a media presentation device is generated by the media presentation device, the operations further including:

receiving, from the media presentation device, the query digital fingerprint data.

15. A system comprising:

a network communication interface;

a processing unit;

non-transitory data storage; and program instructions stored in the non-transitory data storage and executable by the processing unit to carry out operations including:

determining that first digital fingerprint data representing first one or more segments of media content being rendered by a media presentation device matches multiple reference fingerprints each corresponding with a different respective channel;

after determining that the first digital fingerprint data matches the multiple reference fingerprints each corresponding with a different respective channel, performing disambiguation based at least in part on an earlier determination that second digital fingerprint data representing second one or more segments of the media content being rendered by the media presentation device matches a reference fingerprint corresponding with just a single channel, the disambiguation establishing that the single channel carries the media content being rendered by the media presentation device; and taking action based on the establishing that the single channel carries the media content being rendered by the media presentation device.

16. The system of claim 15, wherein the multiple reference fingerprints are selected from a plurality of reference fingerprints in reference data, and wherein determining that the first digital fingerprint data matches the multiple reference fingerprints comprises:

comparing the first digital fingerprint data with the plurality of reference fingerprints in the reference data, and based on the comparing, determining that the first digital fingerprint data matches the multiple reference fingerprints.

17. The system of claim 15, wherein the operations further include detecting and flagging a multi-match group comprising the multiple reference fingerprints, wherein determining that the first digital fingerprint data matches multiple reference fingerprints each corresponding with a different respective channel comprises determining that the first digital fingerprint data matches the reference fingerprints of the flagged multi-match group.

18. The system of claim 15, wherein the second one or more segments of the media content being rendered by the media presentation device comprises media content selected from the group consisting of commercial content and news programming.

19. The system of claim 15, wherein taking action based on the establishing that the single channel carries the media content being rendered by the media presentation device comprises causing supplemental channel-specific content to be presented in conjunction with the media content being rendered by the media presentation device.

20. The system of claim 15, wherein taking action based on the establishing that the single channel carries the media content being rendered by the media presentation device comprises recording presentation of the single channel for use in a channel ratings system.

* * * * *